(12) United States Patent
Tenereillo et al.

(10) Patent No.: US 7,231,458 B2
(45) Date of Patent: Jun. 12, 2007

(54) METHOD AND APPARATUS FOR DISCOVERING CLIENT PROXIMITY USING RACE TYPE TRANSLATIONS

(75) Inventors: Peter A. Tenereillo, Carlsbad, CA (US); William LeBlanc, Atlanta, GA (US); James A. Jordan, Roswell, GA (US)

(73) Assignee: Nortel Networks Limited, St. Laurent (CA)

( * ) Notice: Subject to any disclaimer, the term of this patent is extended or adjusted under 35 U.S.C. 154(b) by 899 days.

(21) Appl. No.: 10/034,171

(22) Filed: Dec. 27, 2001

(65) Prior Publication Data

US 2003/0126198 A1    Jul. 3, 2003

(51) Int. Cl.
*G06F 15/173* (2006.01)
*G06F 15/16* (2006.01)

(52) U.S. Cl. .................... 709/241; 709/245
(58) Field of Classification Search ............... 709/203, 709/217–219, 226, 228, 231, 239, 241, 245
See application file for complete search history.

(56) References Cited

U.S. PATENT DOCUMENTS

| | | | | |
|---|---|---|---|---|
| 6,029,200 | A * | 2/2000 | Beckerman et al. | 709/226 |
| 6,052,718 | A | 4/2000 | Gifford | |
| 6,052,730 | A * | 4/2000 | Felciano et al. | 709/225 |
| 6,070,191 | A | 5/2000 | Narendran et al. | |
| 6,185,598 | B1 * | 2/2001 | Farber et al. | 709/203 |
| 6,292,832 | B1 | 9/2001 | Shah et al. | |
| 6,304,913 | B1 * | 10/2001 | Rune | 709/241 |
| 6,446,121 | B1 * | 9/2002 | Shah et al. | 709/224 |
| 6,553,376 | B1 * | 4/2003 | Lewis et al. | 707/10 |
| 6,606,643 | B1 * | 8/2003 | Emens et al. | 709/203 |
| 6,718,390 | B1 * | 4/2004 | Still et al. | 709/229 |
| 6,724,733 | B1 * | 4/2004 | Schuba et al. | 370/252 |
| 6,742,044 | B1 * | 5/2004 | Aviani et al. | 709/226 |
| 6,795,858 | B1 | 9/2004 | Jain et al. | |
| 6,810,411 | B1 * | 10/2004 | Coughlin et al. | 709/203 |
| 6,920,498 | B1 * | 7/2005 | Gourlay et al. | 709/227 |
| 2002/0038360 | A1 * | 3/2002 | Andrews et al. | 709/223 |
| 2002/0112036 | A1 * | 8/2002 | Bohannon et al. | 709/220 |

* cited by examiner

*Primary Examiner*—Saleh Najjar
*Assistant Examiner*—David Lazaro
(74) *Attorney, Agent, or Firm*—Blakely, Sokoloff, Taylor & Zafman LLP (57) ABSTRACT

A system and method for determining a chronometrically optimal web site location for access by a client based on proximity measurements on established connections that are a result of requests for actual content. In one embodiment, the technique involves a race condition between local domains each transmitting TCP packets loaded with a HyperText Markup Language (HTML) Base tag identifying that local domain. The earliest received TCP packet is incorporated into the TCP stream. In another embodiment, the technique involves a race condition between local domains each transmitting files having links to streaming media translated to point to its own local domain. The earliest received file is incorporated into the TCP stream while the others are discarded as TCP resends. In yet another embodiment, HTTP redirect operations are performed once for each grouping of links only the earliest redirect packet to reach the client is incorporated into the existing TCP stream.

14 Claims, 9 Drawing Sheets

METHOD AND APPARATUS FOR DISCOVERING CLIENT PROXIMITY USING RACE TYPE TRANSLATIONS

FIELD

The invention generally relates to the field of communications. More particularly, the invention relates to an embodiment for managing traffic over a network.

GENERAL BACKGROUND

As usage of the Internet has increased, various web sites have responded by adding such features as redundancy and load balancing. Accordingly, it has become important to direct a client to the geographically closest and least busy web site. The practice of dispersing data from a web site closer to the client is referred to as "client proximity" and has been widely accepted.

In an attempt to direct clients to the geographically closest and least busy web site, a number of techniques have been implemented. Current technologies that attempt to provide a measure of geographic distribution of Web requests rely primarily on Domain Name System (DNS) techniques; namely, techniques normally performed by a Domain Name System (DNS) server alone or in combination with other logic.

One prior technique is Round-Robin Domain Name System (DNS). This technique involves entering multiple IP addresses to represent a single DNS hostname. As clients resolve the hostname, DNS responds by cycling through the multiple listed IP addresses.

Another technique involves computation of routing metrics by the DNS server and these metrics being used to determine how far away a client is from various web sites forming the global domain. This allows the DNS server to answer a DNS request with a web site address associated with a local domain considered to be closest to the client. The primary DNS server can determine the distance from the client to each web site by counting network hops.

Another technique involves the use of a DNS server in conjunction with routers to approximate network distance to a web site from the requester. This technique is achieved through the announcement of a single IP address or a single set of IP addresses throughout the Internet resolving to a single hostname.

Yet another technique involves geographically distributed DNS servers that provide differing IP addresses on a per server basis. This technique is achieved through the announcement of a single IP address for authoritative DNS servers, which when queried may each provide a different response specifying the nearest web site.

While these DNS techniques provide some load sharing capabilities, they are inherently problematic because they are difficult and resource-intensive to resolve. In addition, the DNS solutions are incapable of being content aware and are, at best, useful in assisting a more robust approach by initially guiding a client to a web resource.

There are now attempts to develop a client proximity selection process using personal content directors (i.e. site selectors) in which clients are directed to "chronometrically optimal" locations, namely locations that provide the best overall response time, taking into account all factors including network topology (latency), server response time and the like. Exemplary client proximity processes are described in a commonly-owned, U.S. patent application Ser. No. 09/728,305 (filed Nov. 30, 2000) and a concurrently filed U.S. Patent Application entitled "A Method and Apparatus For Discover Client Proximity Using ILX Translations" (App. No. 10/027,686).

During "Refresh", "Image Insert" and even "ILX" modes of operation, the client proximity process uses HTTP redirects to enable a client to point at another site after client proximity computations have completed. The use of HTTP redirects, being additional overhead, pose many disadvantages. For illustrative example of an HTTP redirect is set forth below in Table 1.

TABLE 1

| HTTP Redirect | |
|---|---|
| HTTP Header | Contents |
| Status Line | HTTP/1.1 307 (for version 1.1 clients) HTTP/1.0 302 (for version 1.0 clients) |
| General Header | Cache-Control: Private Connection: Close Date: <GMT Date> |
| Response Header | Server: <name of this Internet Site Selector> Pad: <pad characters> Location: HTTP://wwwa.nortelnetworks.com Expires: <GMT + configurable time> Content-Length: x Content-Type: text/html |

For instance, HTTP redirects cause additional traffic over the network and additional latency to complete these Transmission Control Protocol (TCP) connections. In addition, HTTP redirects are also visible by the client viewing his or her browser, which may be undesired by the web site owners. Also, bookmarks to a selected site after the client proximity computations may preclude such client proximity computations to be performed for that client in the future.

For streaming media environments, the overhead associated with redirects is small in comparison with the amount of information downloaded. While redirects are supported by the RTSP protocol used by QUICKTIME® players by Apple Computer of Cupertino, Calif. and REALPLAYER® by RealNetworks of Seattle, Wash., they are not supported by the MICROSOFT® Media Services (mms) protocol. A technique that can be utilized by many streaming video protocols is desired.

SUMMARY

In general, the invention relates to a system and method for determining a chronometrically optimal web site location for access by a client based on proximity measurements on established connections that are a result of requests for actual content.

For one embodiment, at each web site, at least one TCP packet of downloaded content is loaded with a HyperText Markup Language (HTML) Base tag identifying that local domain and is subsequently sent to the client under a race condition. The earliest received TCP packet is incorporated into the TCP stream while the other competing TCP packets are considered resends and disregarded. The remaining packets forming the entire downloaded content are sent from the synchronizing personal content director (PCD). Hence, during that session, future requests are directed to the most proximate web site (web site associated with the earliest TCP packet).

For another embodiment, a single packet sized file (e.g., file configured in accordance with any metafile format) is retrieved by the synchronizing PCD and undergoes translations for various links to point to its local domain. All links may be subject to the same translations or one proximity computation is performed and remaining links remain unchanged. The file is also sent to other participating PCDs, which perform similar translations. The duplicated files are sent to the client by each PCD under a race condition, normally simultaneously, and the earliest received ASX file is incorporated into the TCP stream while the others are discarded as TCP resends. Hence, during that session, future requests are directed to the most proximate web site.

For yet another embodiment, the synchronizing PCD performs a grouping of link types upon retrieving a requested file. An HTTP redirect footrace is performed once for each group of links (the footrace process is performed as described in patent application Ser. No. 09/728,305). Each redirect string sent by remote PCDs directs the client to once again connect back to the synchronizing PCD. Only the first redirect packet to reach the client is incorporated into the existing TCP stream. Similar to the double-redirect method, the redirect string contains a tag that indicates which remote PCD won the footrace. The redirect races are performed sequentially, one for each group of links, until the proximity for all groups has been learned. At this point, the synchronizing PCD rewrites all links in all groups to point to the most proximate local domain (there is no need to send the metafile to the remote PCDs).

BRIEF DESCRIPTION OF THE DRAWINGS

The features and advantages of the invention will become apparent from the following detailed description of the invention in which.

DETAILED DESCRIPTION

In general, one embodiment of the invention relates to a system and method for determining a chronometrically optimal (most proximate) web site location for access by a client based on proximity measurements on established connections that are a result of requests for actual content. For a Base Uniform Resource Identifier (URI) is substituted with an HTML Base tag by the PCDs. For a second embodiment, link translations are conducted by the PCDs on links found in retrieved files such as playlists for example. Yet, for a third embodiment, HTTP redirect footraces for groups of link types are iteratively conducted by the PCDs, and subsequently link translation (instead of HTTP redirect) is used as an execution method.

Certain details are set forth below in order to provide a thorough understanding of the invention, albeit the invention may be practiced through many embodiments other that those illustrated. Well-known logic and operations are not set forth in detail in order to avoid unnecessarily obscuring the invention.

In the following description, certain terminology is used to describe certain features of the invention. For example, a "personal content director" or "PCD" is a computing device that is adapted to a network (e.g., the Internet) in order to optimize performance of domains hosted on geographically distributed, mirrored web sites. Normally, a PCD comprises internal logic, namely hardware, firmware, software module(s) or any combination thereof, having an architecture generally equivalent to a computer (e.g., server, desktop, laptop, hand-held, mainframe, or workstation), set-top box, or a network switching device such as a router, bridge or brouter.

A "client" is a computing device that executes Web Browser software to communicate over a network in order to download information from a web site. Such information may include HyperText Markup Language (HTML) web pages, Microsoft ASX files or RealNetworks SMIL (Synchronized Multimedia Integration Language) or similar metafile formats from Apple QuickTime or others. In two embodiments, the HTML web page contains a metafile format that initiates execution of a streaming media player such as WINDOWS MEDIA™ player or REALPLAYER® as the final target client application A "software module" is a series of instructions that, when executed, performs a certain function. Examples of a software module include an operating system, an application, an applet, a program or even a routine. One or more software modules may be stored in a machine-readable medium, which includes but is not limited to an electronic circuit, a semiconductor memory device, a read only memory (ROM), a flash memory, a type of erasable programmable ROM (EPROM or EEPROM), a floppy diskette, a compact disk, an optical disk, a hard disk, or the like.

Figure 1:
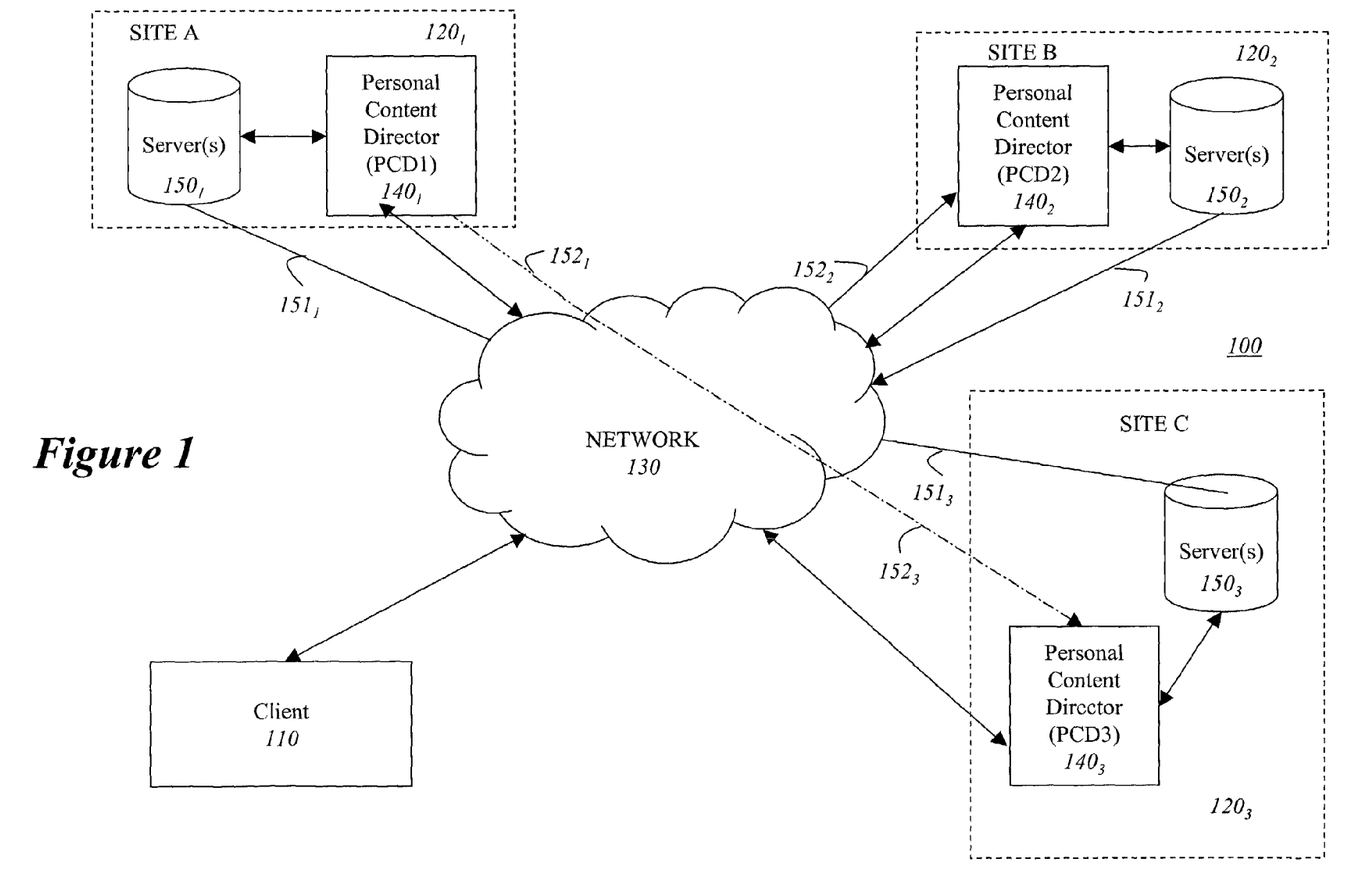
FIG. 1 is an exemplary embodiment of a communication system utilizing personal content directors (PCDs) according to the invention.

Referring to FIG. 1, an exemplary embodiment of a communication system utilizing personal content directors (PCDs) is shown. Herein, system 100 comprises a client 110 in communication with a plurality of geographically dispersed web sites $120_1$–$120_N$ over a network 130, where "N" is equal to three for this embodiment. Of course, other embodiments may exist with more than three replicated web sites (N≧4). These web sites $120_1$–$120_3$ may be fully replicated, meaning that each of these web sites feature content requested by the client 110. In some cases, these web sites $120_1$–$120_3$ store identical content.

As shown, web site $120_1$ includes a personal content director (PCD) $140_1$ and a server farm $150_1$. A "server farm" is generally defined as a server or multiple servers operating in a collective manner. Similarly, web sites $120_2$ and $120_3$ include PCDs $140_2$ and $140_3$ and server farms $150_2$ and $150_3$, respectively. The PCD $140_1$, $140_2$ or $140_3$ that receives the initial client request for that session is referred to as the "synchronizing PCD", which orchestrates the client proximity selection process.

During the client proximity selection process, each PCD $140_1$–$140_3$ is adapted to operate as a proxy server to communicate requests by client 110 to one or more servers $150_1$–$150_3$. During normal operations, however, the servers $150_1$–$150_3$ are in communication with the client 110 over network 130 as shown by routing paths $151_1$–$151_3$. Moreover, each PCD $140_1$–$140_3$ is further configured to communicate with each other and client 110 using appropriate Transmission Control Protocol (TCP) communication over network 130 as shown by paths $152_1$–$152_3$.

For this embodiment, network 130 is any type of wide area network (WAN) such as the Internet. Of course, network 130 may be configured as a type of local area network (LAN) while still maintaining the spirit and scope of the invention.

Although not shown, system 100 may include an authoritative Domain Name Server (DNS) that resolves (translates) an alphanumeric, web site domain name into addresses recognized by the PCDs $140_1$–$140_3$. For the system 100, multiple distributed web sites $120_1$–$120_3$ appear to be a single domain (referred to as a "global domain"). A global domain may be separated into multiple "real" web sites, each referred to herein as "local domains" and uniquely registered in DNS with a unique uniform resource locator (URL) for example. To participate in the client proximity selection process, a PCD needs to be configured as a member of that local domain. Each PCD can have more than one global domain; a mirror web site can support more than one local domain; and a PCD can be a member of more than one local domain.

For example, in one embodiment, the web site domain "www.nortelnetworks.com" may be resolved into one of a plurality of IP addresses that is associated with a participating PCD $140_1$–$140_3$ of web sites $120_1$–$120_3$, respectively. These IP addresses are entered into DNS as the addresses for the web site domains shown in Table 1. Such selection as to which IP address may be

TABLE 1

| DNS Name | Participant PCDs |
|---|---|
| www.nortelnetworks.com | PCD A, B, C |
| wwwa.nortelnetworks.com | 1.1.1.1 (PCD A) |
| wwwb.nortelnetworks.com | 2.2.2.2 (PCD B) |
| wwwc.nortelnetworks.com | 3.3.3.3 (PCD C) |

Figure 2:
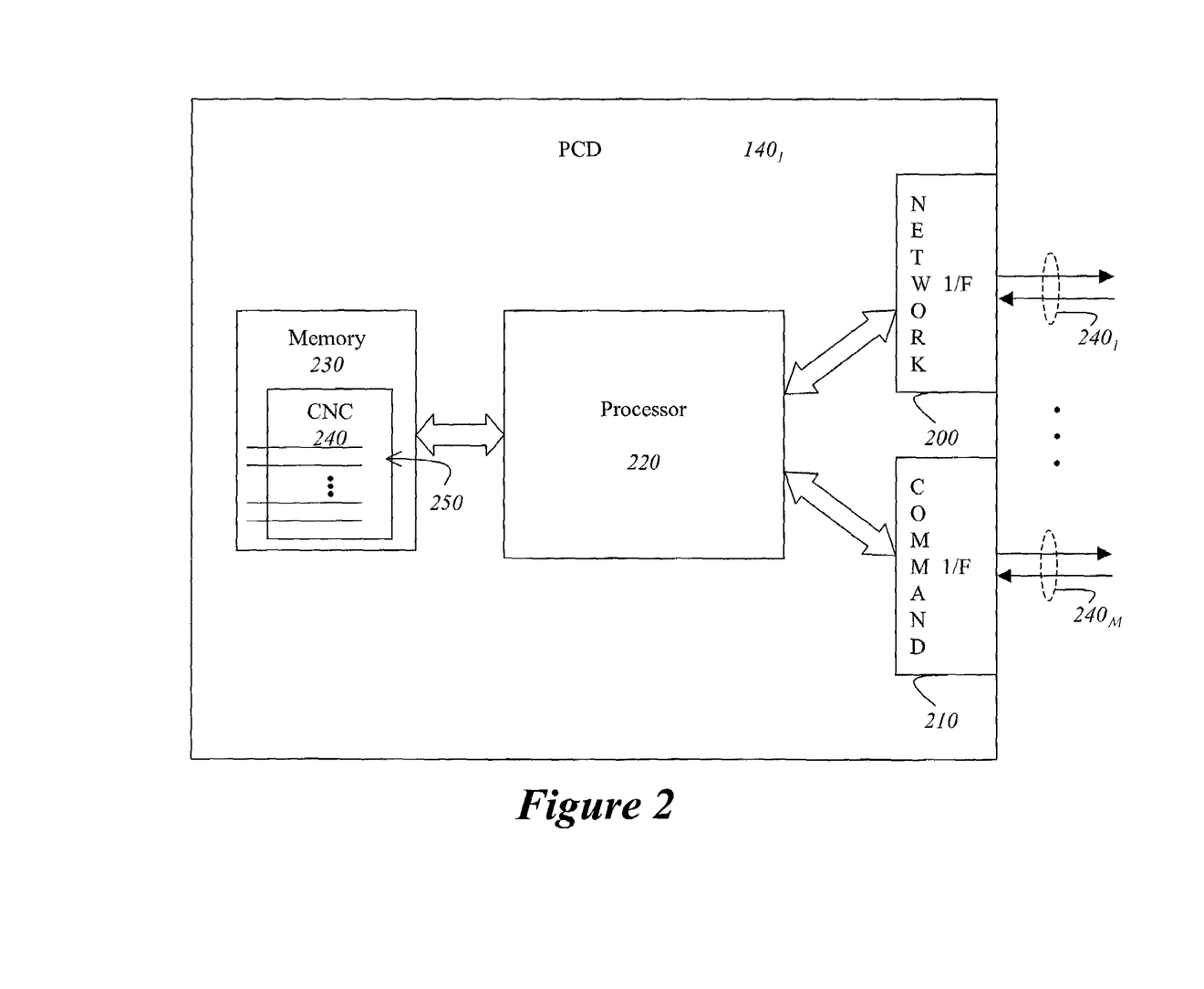
FIG. 2 is an exemplary embodiment of a personal content director (PCD) of FIG. 1.

Referring now to FIG. 2, an exemplary embodiment of a personal content director (PCD) $140_1$ of FIG. 1 is shown. PCD $140_1$ comprises a network interface 200, a command interface 210, a processor 220 and memory 230. Network interface 200 supports multiple TCP communication streams. As shown, one TCP stream $240_1$ may be a Hypertext Transfer Protocol (HTTP) GET request. Another TCP stream $240_M$, routed to/from the command interface 210, includes time synchronization messages. These messages feature response time statistics to coordinate simultaneous transmissions of TCP packets to the client 110 of FIG. 1 by all PCDS, inclusive of PCD $140_1$. For enhanced security, such transmissions may be authenticated in accordance with a message digest based (MD5) authenticated protocol running on TCP.

Processor 220 controls the retrieval of content from server(s) at the web site 120, of FIG. 1. Examples of processor 220 may include, but is not limited or restricted to a microprocessor, digital signal processor, application specific integrated circuit (ASIC), microcontroller, and the like.

Memory 230 is loaded with (i) software modules executable by processor 220 to support client proximity selection process operations of web site $120_1$ and (ii) perhaps a client network cache (CNC) 240. When employed, CNC 240 can be configured to store representations of client network addresses associated with client/local domain responses. For two modes of operation, "Page Race" and "Meta File Race" to use CNC, for one embodiment, an additional HTTP or RTSP link may be inserted within the transmitted page or metafile. This link would point to the synchronizing PCD, and would merely cause the client to initiate a connection indicating which local domain won the race. "Link-by-Link Meta File Translation" would not require such links because it provides a redirect to the synchronizing PCD already Upon receiving an initial client request (e.g., HTTP GET request), PCD $140_1$ acts as the synchronizing PCD. Upon finding an entry 250 in its CNC 240, synchronizing PCD $140_1$ would direct client 110 of FIG. 1 to the associated web site, thus avoiding data overhead for client proximity selection. CNC 240 can correlate user data based on DNS name of the client or IP address and compare this data to allow a client that has yet not established a connection with synchronizing PCD $140_1$ to benefit from previous client connections. If no entry is found, however, synchronizing PCD $140_1$ may enter into a selected mode of operation for the client proximity selection process; namely, "Page Race" mode, "Meta File Race" mode or "Link-by-Link Meta File Translation" mode.

A. Page Race Mode

Figure 3:
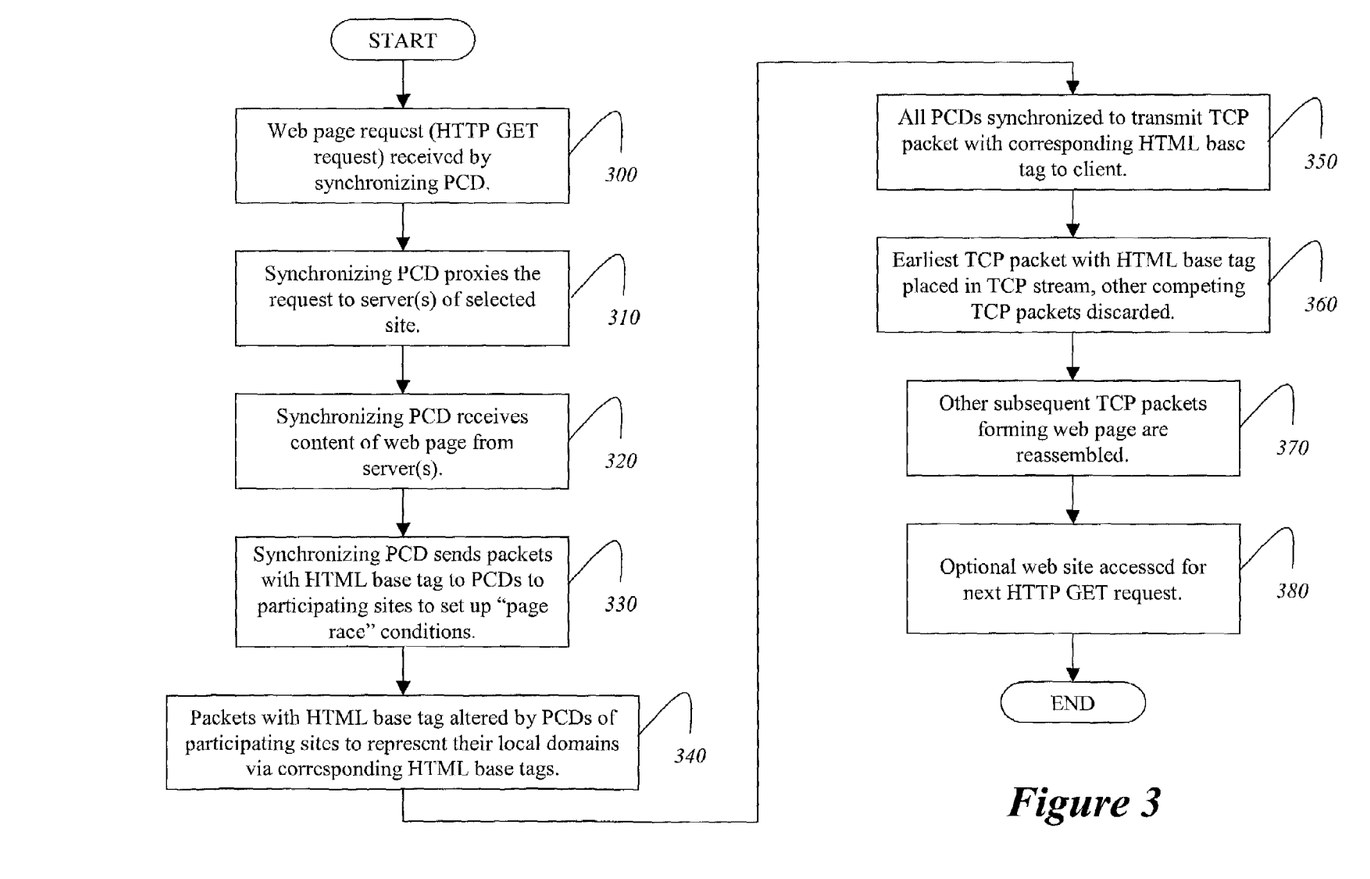
FIG. 3 is an exemplary embodiment of the operations conducted by a selected, synchronizing PCD in accordance with a "Page Race" mode of operation.

Referring now to FIG. 3, an exemplary flowchart of the operations conducted by internal logic within a selected, synchronizing personal content director (PCD) in accordance with a "Page Race" mode of operation is shown. Initially, during the client proximity selection process, a web page request (e.g., HTTP GET request) is received by a PCD, now referred to as the synchronizing PCD (block 300). As briefly stated above, in one embodiment, the DNS server chooses the synchronizing PCD and forwards the web page request thereto.

Upon receiving the request, the synchronizing PCD proxies server(s) of its Web site for requested content forming the Web page (block 310). For instance, the requested content may form a home page (default.html). The home page may include an explicit Base Uniform Resource Identifier (Base URI) HTML tag (referred to as "Base URI"), which is used as the base of an HTML document for the purpose of resolving hyperlink destinations. For instance, the Base URI may be represented as <Base URI="www.nortelnetworks.com">. In the event that a Base URI is not explicitly specified, the client software will use the requested URI (the URI of the original request) as the Base URI.

As described in blocks 320 and 330, synchronizing PCD receives the content from the server(s) and segments the content into multiple TCP packets. The first TCP packet includes the base URI. Thereafter, only the first TCP packet including the Base URI is sent to all participating PCDs to set up a race condition. As an alternative embodiment, the synchronizing PCD may substitute the Base URI for an HTML Base tag to point to its own local domain before the content is segmented. The HTML base tag may be represented as <Base href="wwwa.nortelnetworks.com">. Hence, the TCP packet routed to the other PCDs would include the HTML Base tag for the synchronizing PCD, which would be replaced as described.

Figure 4:
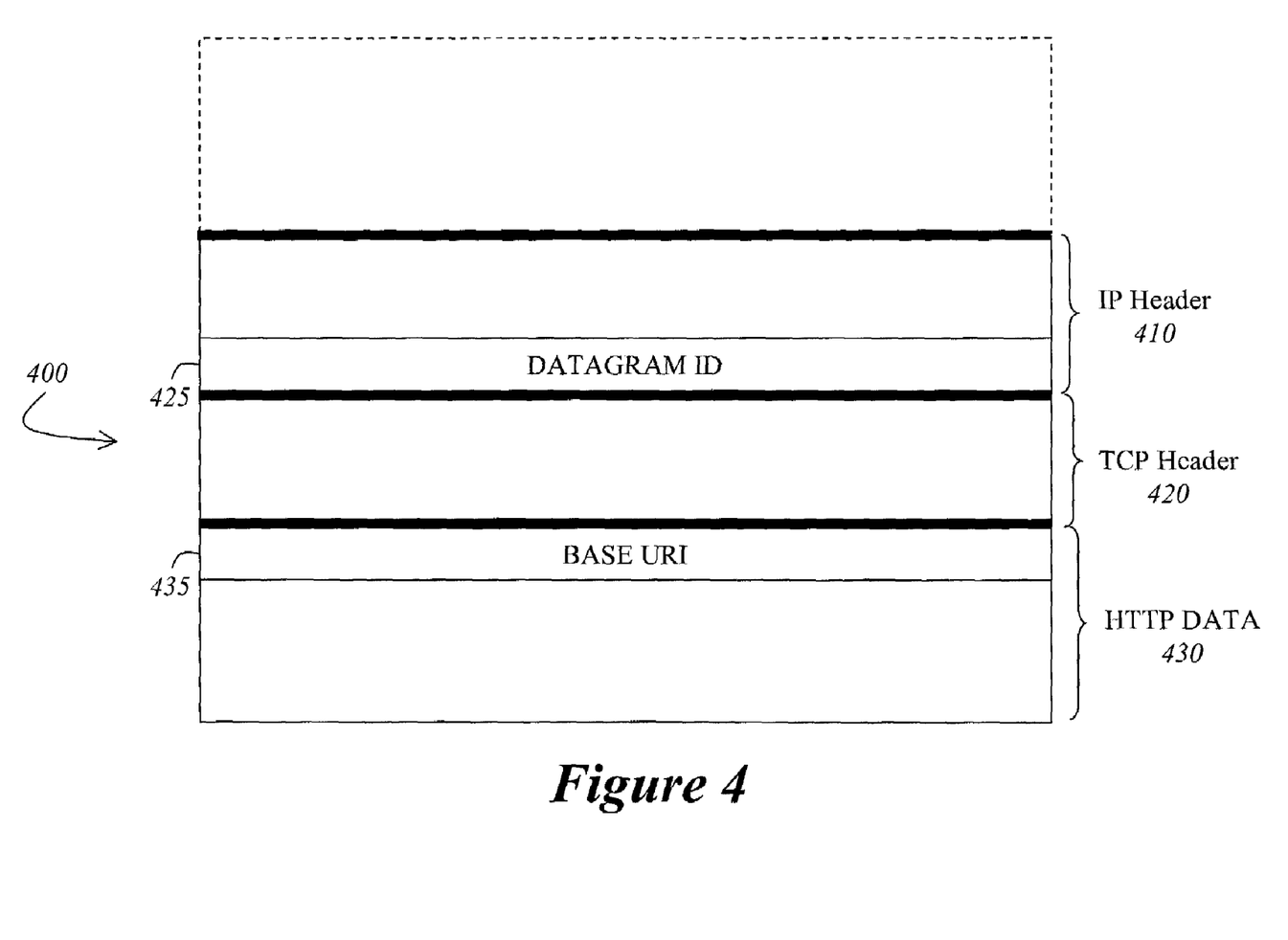
FIG. 4 is an exemplary embodiment of a TCP packet transmitted from the synchronizing PCD to other PCDs of the communication system.
Figure 5:
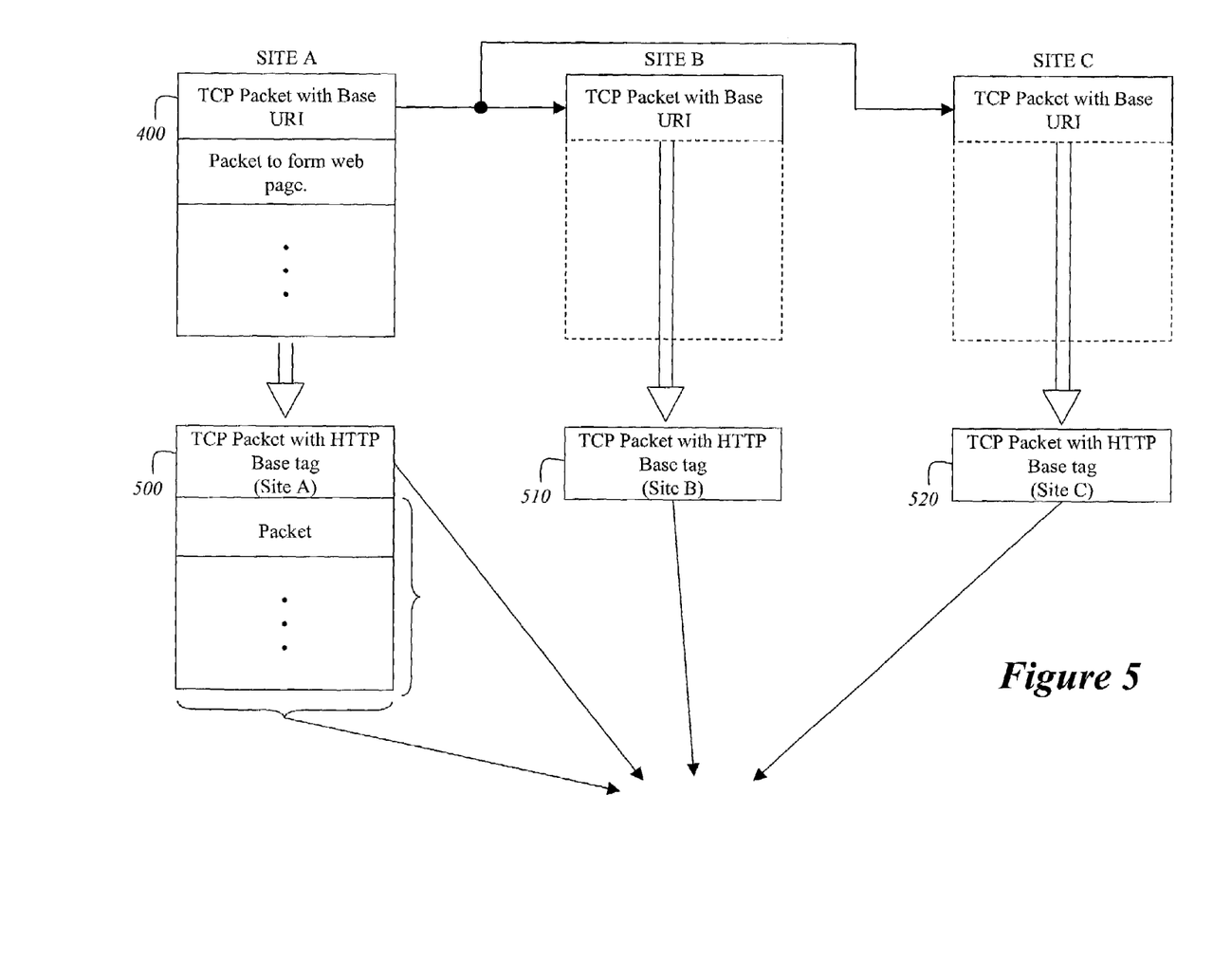
FIG. 5 is an exemplary embodiment of operations performed by PCDs of web sites during a Page Race mode of operation.

Referring now to FIGS. 3–5, an exemplary embodiment of a TCP packet transmitted from the synchronizing PCD to other PCDs of the communication system is shown. The TCP packet 400 comprises an IP header 410, a TCP header 420 and HTTP data field 430. The IP header 410 includes a datagram identifier (ID) 425 to support reassembly of IP packets into TCP segments and to allow out-of-order transmissions of such packets. The HTTP data field 430 includes at least the Base URI 435. At the synchronizing PCD and each receiving PCD, the Base URI 435 is substituted for an HTML Base tag that points to its own local domain (see block 340 of FIG. 3).

For example, at the synchronizing PCD 140₁, the Base URI 435 is substituted for a HTML Base tag 500, namely <Base href="wwwa.nortelnetworks.com">. Similarly, at PCD 140₂, the Base URI is substituted for a different HTML Base tag 510, namely <Base href="wwwb.nortelnetworks.com">. At PCD 140₃ of FIG. 1, the received Base URI is substituted for a different HTML Base tag 520 <Base href="wwwc.nortelnetworks.com">. The TCP packets featuring the HTML Base tags 500, 510 and 520 are each transmitted generally simultaneous or at least generally concurrent to one another.

Referring back to FIG. 3, in one embodiment, all PCDs are synchronized to transmit their TCP packet with HTML Base tag (namely the "first TCP packets") to the client in a generally simultaneous manner (block 350). The synchronization of the transmission is through the exchanged time synchronization messages over separate TCP connections (referred to as "inter-box protocol (IBP) connection"). Such transmissions may be authenticated in accordance with a message digest based (MD5) authenticated protocol running on TCP in which a hash value for the message is contained within that message. The hash value is extracted and compared with a hash result produced by processing message data through a hash function (e.g., MD5) using a key identified by a key identifier within that message as well. Further details of such synchronization is described in U.S. Pat. No. 09/728,305 incorporated herewith by reference.

Although not shown, in accordance with another embodiment, the first TCP packets may be transmitted generally concurrent with each other. For this embodiment, the PCDs may impose transmission time delays to account for different loads at the sites (load-balancing).

The earliest first TCP packet with the HTML Base tag received by the client is incorporated into the TCP stream while the other first TCP packets are disregarded as TCP resends (block 360). The other packets forming the web page are reassembled with the earliest first TCP packet in accordance with their sequence numbers (block 370). In response to the next HTTP GET request, the web site with optimal client proximity (winner of the race condition identified by the accepted HTML Base tag) is now accessed during that session (block 380). It is contemplated that once the session is discontinued or disrupted, the client proximity selection process may need to be conducted to ensure optimal network performance.

B. "Meta File Race" Mode

Figure 6:
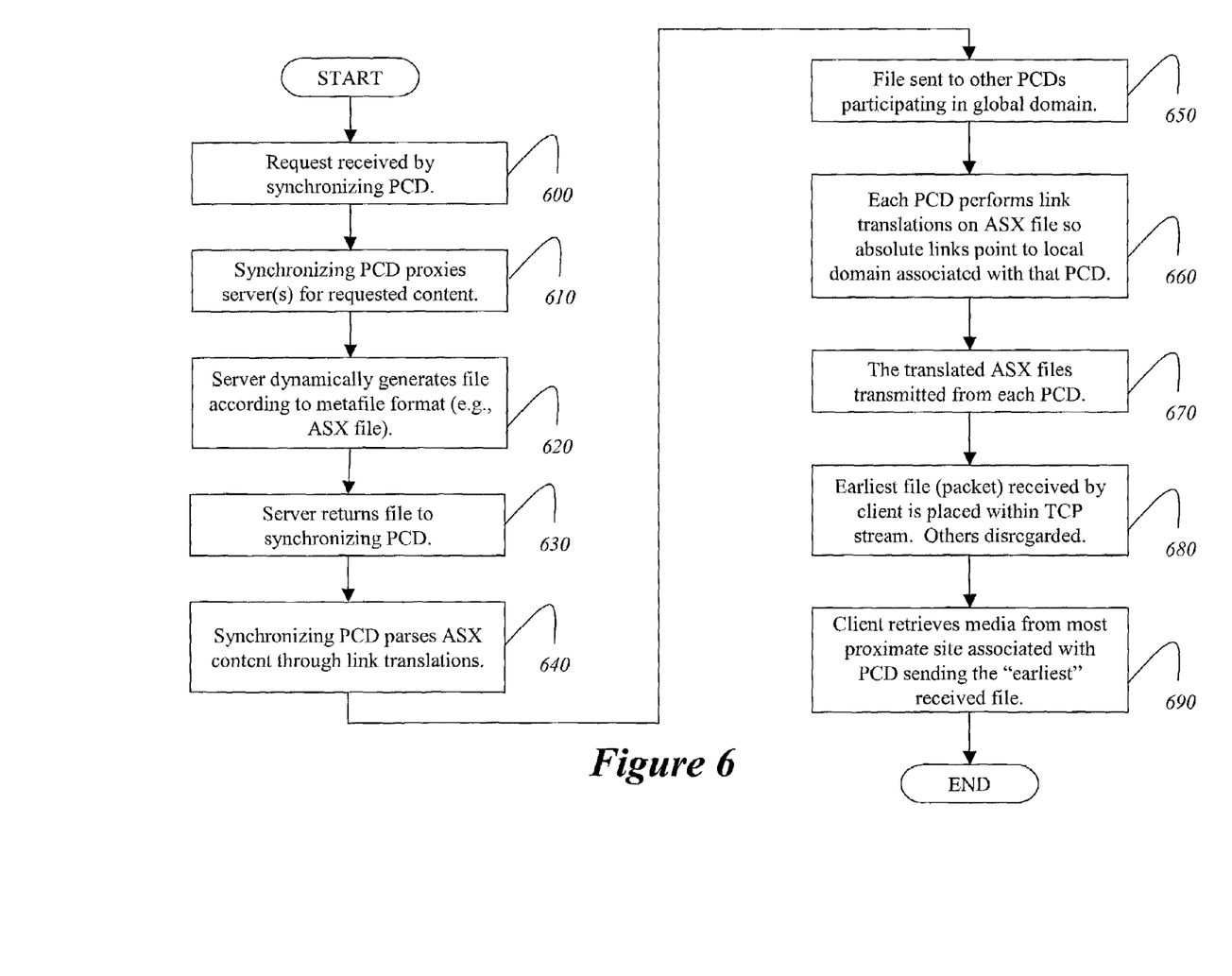
FIG. 6 is an exemplary flowchart of the operations conducted by a selected, synchronizing PCD in accordance with a "Meta File Race" mode of operation.

Referring now to FIG. 6, an exemplary flowchart of the operations conducted by internal logic within a selected, synchronizing personal content director (PCD) in accordance with a "Meta File Race" mode of operation is shown. For this embodiment, content is fully replicated over each web site 120₁–120₃ of FIG. 1. All links are subject to the same translations. Of course, as an alternative embodiment, it is contemplated that all links may not be subject to the same translation provided one proximity computation is performed. This case is covered by embodiment "C" below.

Initially, during the client proximity selection process, a request (e.g., HTTP GET request for a metafile, such as a Microsoft ASX or RealMedia SMIL file; such files may be identified by filename extention, e.g. ".asx" or ".ram", or by file content) is received by the synchronizing PCD (block 600). The request may be directed from the client or from the DNS server, which selects the synchronizing PCD and forwards the request thereto.

Upon receiving the request, the synchronizing PCD proxies server(s) of its Web site for requested content (block 610). In response to receiving the request, one of the servers returns a file (most likely a dynamically generated file) configured in accordance with any the metafile format desired (block 620). The file may be a "playlist," namely a list of linked titles for streaming media capable of being downloaded from the server(s). The selection of which media links are placed within the file may be based on demographics or prior site accesses by the user.

For example, the file may be configured in an ASX metafile format used with WINDOWS MEDIA™ services supported by Microsoft Corporation of Redmond, Wash. This particular configuration will be described in this embodiment for illustrative purposes only. Alternatively, of course, the file may be configured in RAM or SMIL metafile formats supported by a media player produced by RealNetworks of Seattle, Wash. or even another type of metafile format.

Thereafter, the server returns the file (e.g., ASX file) to the synchronizing PCD (block 630). The synchronizing PCD parses the links of the ASX file under predetermined link translation rules to determine whether any translations are warranted and conducts link translations (block 640). These "link translation rules" indicate which links may or may not undergo link translations during the client proximity selection process.

Figure 7:
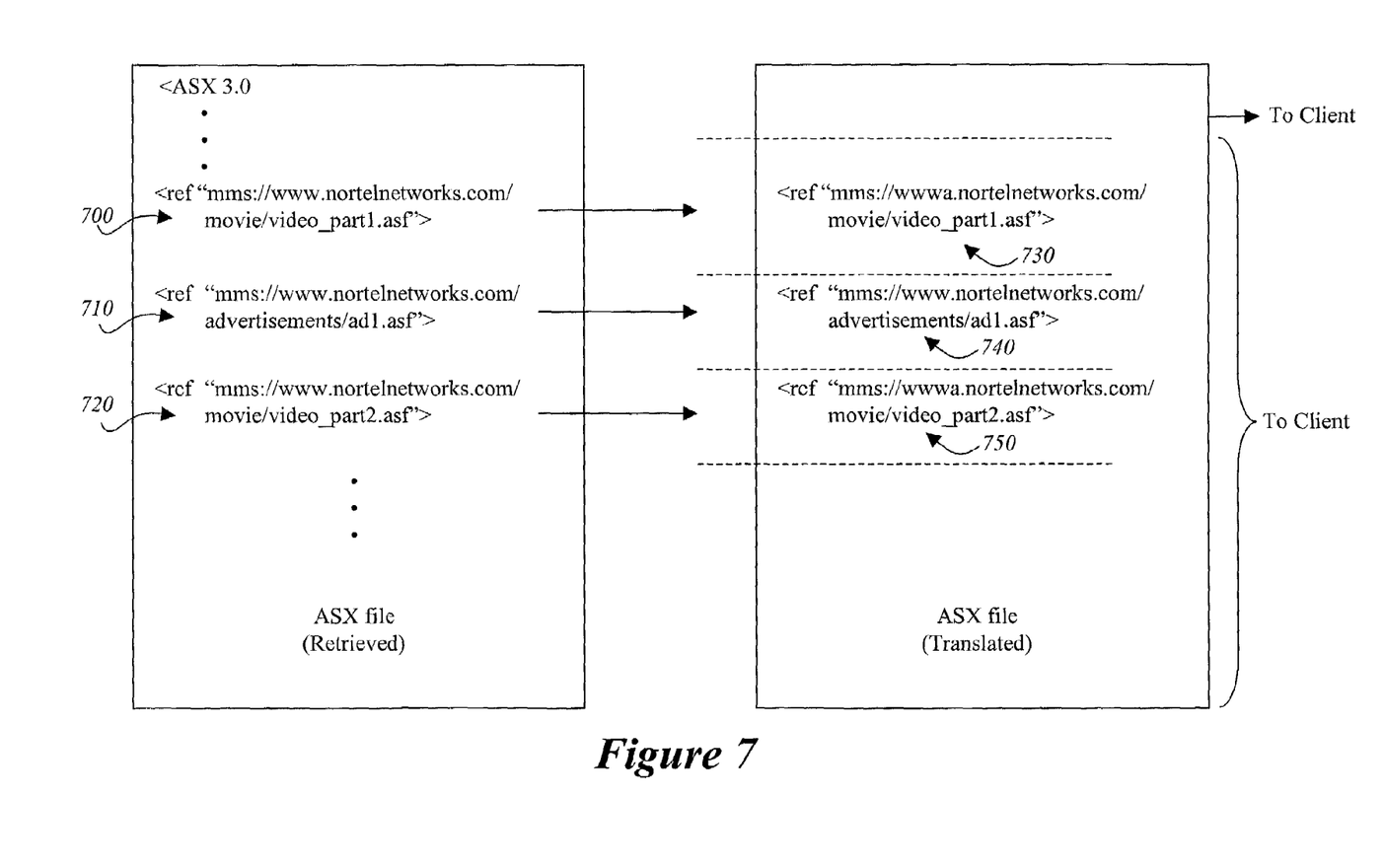
FIG. 7 is an exemplary embodiment of operations performed by PCDs of web sites during a Meta File Race mode of operation.

For example, as shown in FIG. 7, the synchronizing PCD may perform translations for relative links 700, 710 and 720 involving MICROSOFT® Media Services "mms" and web site www.nortelnetworks.com. If such translations are warranted, the ASX file is altered to links 730, 740 and 750 that points to its own local domain. As shown for illustrative purposes, the relative link 700 <ref "mms://www.nortelnetworks.com/movie/video-part1.asf"> is translated by PCD 140₁ of FIG. 1 as <ref "mms://wwwa.nortelnetworks.com/movie/video-part1.asf"> 730. Similarly, link 720 <ref "mms://www.nortelnetworks.com/movie/video-part2.asf"> is translated by PCD 140₁ of FIG. 1 as <ref "mms://wwwa.nortelnetworks.com/movie/video-part2.asf"> 750. To illustrate the reason for configurable link translation rules, the relative link 710 <ref "mms://www.nortelnetworks.com/advertisements/ad1.asf"> is not translated by PCD 140₁ of FIG. 1 as <ref "mms://wwwa.nortelnetworks.com/advertisements/ad1.asf"> 740, but is instead left alone. Such functionality is useful because it is often not practical to serve advertisements from remote sites, as advertisement content changes more often and varies more per user (e.g. by demographics).

Referring back to FIG. 6, the ASX file is also sent to all participating PCDs over secured (authenticated) or unsecured communications via the command interface (over authenticated IBP connection) as described in block 650. Each of the participating PCDs performs link translations as describe above so that the absolute links point to its own local domain (block 660). Corresponding AFX files, each being a single packet, are transmitted by all of the PCDs to the client (block 670).

In one embodiment, all PCDs are synchronized to transmit the translated packet (ASX file), where synchronization is accomplished through time synchronization messages exchanged by the PCDs over separate TCP connections via the command interface. This enables generally simultaneous transmissions or generally concurrent transmissions where transmission delays may occur to account for different loads at the sites (load-balancing).

The earliest translated packet received by the client is placed within the TCP stream while subsequent packets are disregarded as TCP resends (block 680). Thereafter, the client retrieves media from the most proximate site during that session (block 690).

C. "Link-by-Link Meta File Race" Mode

Figure 8:
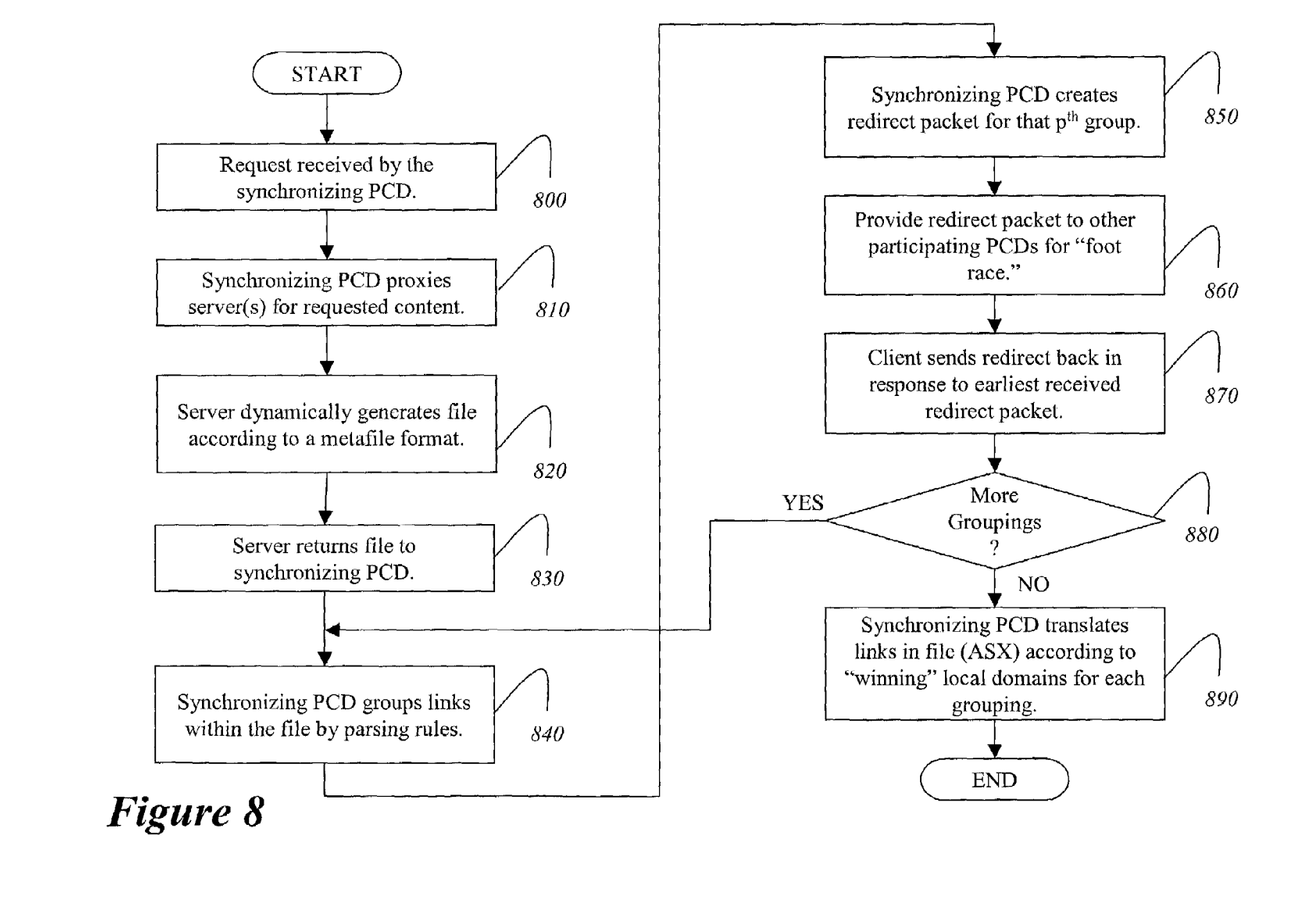
FIG. 8 is an exemplary flowchart of the operations conducted by a selected, synchronizing PCD in accordance with a "Link-by-Link Meta File Race" mode of operation.

Referring now to FIG. 8, an exemplary flowchart of the operations conducted by internal logic within a selected, synchronizing personal content director (PCD) in accordance with a "Link-by-Link Meta File Race" mode of operation is shown. Initially, during the client proximity selection process, a request (e.g., HTTP GET request) is received by the synchronizing PCD (block 800). The request may be directed from the client or from the DNS server, which selects the synchronizing PCD and forwards the request thereto.

Upon receiving the request, the synchronizing PCD proxies server(s) of its Web site for requested content (block 810). In response to receiving the request, one of the servers dynamically generates a file (e.g., a playlist) configured in accordance with any the metafile format desired (block 820).

For example, the file may be configured in an ASX metafile format used with WINDOWS MEDIA™ services supported by Microsoft Corporation of Redmond, Wash. This particular configuration will be described in this embodiment for illustrative purposes only. Alternatively, of course, the file may be configured in PAM, SMIL or another type of metafile format.

Thereafter, the server returns the file (e.g., ASX file) to the synchronizing PCD (block 830). The synchronizing PCD groups the links within the file according to a particular granularity provided by the parsing rules followed by the internal logic of the PCD (block 840). Thereafter, the synchronizing PCD creates a redirect packet for a first grouping and provides such packets to the participating PCDs to perform a foot race operation via HTTP or RTSP (block 850 and 860). The client sends a redirect back in response to the earliest received redirect packet from the synchronizing PCD and participating PCDs (block 870). This redirect indicates the most proximate site (identification of the web site from which the earliest received redirect packet is associated). This process continues until all groupings have been handled, even a grouping with a single link (block 880). After synchronizing PCD has information regarding the proximate (winning) local domains for each grouping, the synchronizing PCD now translates the relative links in the ASX file accordingly for transmission to the client (block 890).

Figure 9:
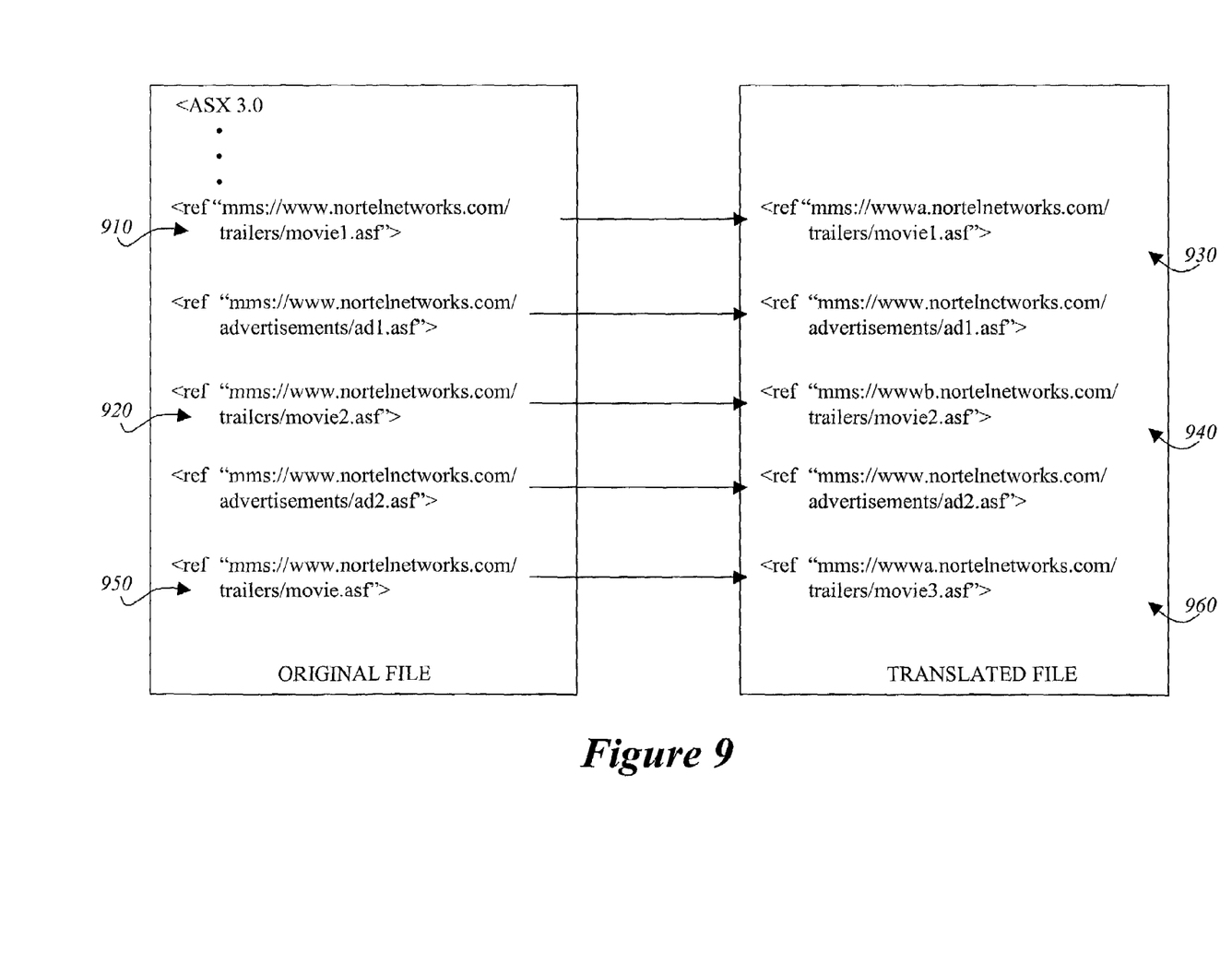
FIG. 9 is an exemplary embodiment of operations performed by PCDs of web sites during a Link-by-Link Meta File Race mode.

For example, as shown in FIG. 9, the synchronizing PCD may perform translations for relative trailer links 910 and 950 in the same category (trailers for domestic feature films) to be altered as links 930 and 960, which point to the local domain for the synchronizing PCD (site A). A link 920 concerning a trailer for a foreign film may be grouped directly and translated to a more proximate site (site B) as represented by link 940. Herein, certain link types do not undergo translations (e.g., advertisements within virtual directory "advertisements"). While this invention has been described with reference to illustrative embodiments, this description is not intended to be construed in a limiting sense. Various modifications of the illustrative embodiments, as well as other embodiments of the invention, are deemed to lie within the spirit and scope of the invention.

What is claimed is:

1. Adapted for a network including a client and a plurality of local domains including at least a first local domain and a second local domain, a method comprising:

segmenting content including a Base Uniform Resource Identifier (URI) into multiple packets by a personal content director of the first local domain, a first packet of the multiple packets including the Base URI;

transmitting the first packet of the multiple packets by the personal content director of the first local domain to at least a personal content director for the second local domain;

substituting the Base URI for a HyperText Markup Language (HTML) Base tag within each of the first packets by the personal content directors of at least the first and second local domains, the HTML Base tag substituted by the personal content director of the first local domain now points to the first local domain and the HTML Base tag substituted by the personal content director of the second local domain now points to the second local domain; and transmitting the first packets with the HTML Base tags by the personal content directors to the client;

incorporating an earliest first packet received by the client from the plurality of personal content directors into a data stream and disregarding the later received first packets; and accessing the local domain associated with the personal content director that transmitted the first packet earliest received by the client for subsequent data requests.

2. The method of claim 1, wherein prior to segmenting the content, the method further comprises:

retrieving content by the personal content director at the first local domain.

3. The method of claim 2, wherein the Base URI is an Uniform Resource Identifier (URI) provided by an initial request by the client causing retrieval of the content by the personal content director at the first local domain.

4. The method of claim 1, wherein the transmitting of the first packets is synchronized through an exchange of time synchronization messages over separate Transmission Control Protocol (TCP) connections.

5. The method of claim 1, wherein transmission of the first packet between the personal content director at the first local domain and at least the personal content director at the second local domain is made over an authenticated communication link.

6. The method of claim 1, wherein the first packets with the HTML Base tags are simultaneously transmitted by the personal content directors.

7. The method of claim 1, wherein the first packets with the HTML Base tags are transmitted by the personal content directors substantially concurrent to each other.

8. Adapted for a network including a client and a plurality of local domains including at least a first local domain and a second local domain, a method comprising:

substituting a Base Uniform Resource Identifier (URI) included in content for a HyperText Markup Language (HTML) Base tag within packets of the content by personal content directors of at least the first local domain and the second local domain, the HTML Base tag substituted by the personal content director of the first local domain now points to the first local domain and the HTML Base tag substituted by the personal content director of the second local domain now points to the second local domain; and transmitting packets with the HTML Base tags by the personal content directors of the first local domain and the second local domain to the client;

incorporating an earliest received packet with the HTML Base tag by the client into a data stream and disregarding later received packets with the HTML Base tag; and accessing the local domain associated with the personal content director that transmitted the earliest received packet by the client for subsequent data requests.

9. The method of claim 8, wherein prior to substituting the Base URI, the method further comprising:

retrieving content by the personal content director at the first local domain;

segmenting content including the Base URI into multiple packets by the personal content director of the first local domain, a first packet of the multiple packets including the Base URI; and transmitting the first packet of the multiple packets by the personal content director of the first local domain to at least a personal content director for the second local domain.

10. The method of claim 9, wherein the Base URI is an Uniform Resource Identifier (URI) provided by an initial request by the client causing retrieval of the content by the personal content director at the first local domain.

11. The method of claim 9, wherein the transmitting of the first packets is synchronized through an exchange of time synchronization messages over separate Transmission Control Protocol (TCP) connections.

12. The method of claim 9, wherein transmission of the first packet between the personal content director at the first local domain and at least the personal content director at the second local domain is made over an authenticated communication link.

13. The method of claim 8, wherein the packets with the HTML Base tags are simultaneously transmitted by the personal content directors.

14. The method of claim 8, wherein the packets with the HTML Base tags are transmitted by the personal content directors substantially concurrent to each other.

* * * * *